United States Patent
Suzuki et al.

(10) Patent No.: US 10,884,200 B2
(45) Date of Patent: Jan. 5, 2021

(54) OPTICAL PATH CONVERTING COMPONENT

(71) Applicant: KYOCERA Corporation, Kyoto (JP)

(72) Inventors: Takahiro Suzuki, Yamato (JP); Kazumi Nakazuru, Yokohama (JP); Masatoshi Tsunoda, Machida (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/344,652

(22) PCT Filed: Oct. 23, 2017

(86) PCT No.: PCT/JP2017/038170
§ 371 (c)(1),
(2) Date: Apr. 24, 2019

(87) PCT Pub. No.: WO2018/079480
PCT Pub. Date: May 3, 2018

(65) Prior Publication Data
US 2020/0064570 A1     Feb. 27, 2020

(30) Foreign Application Priority Data
Oct. 26, 2016   (JP) .................. 2016-209826

(51) Int. Cl.
*G02B 6/42*        (2006.01)
(52) U.S. Cl.
CPC .......... *G02B 6/4214* (2013.01); *G02B 6/4244* (2013.01)
(58) Field of Classification Search
None
See application file for complete search history.

(56) References Cited

U.S. PATENT DOCUMENTS

| | | |
|---|---|---|
| 2008/0232737 A1 | 9/2008 | Ishigami et al. |
| 2013/0259427 A1 | 10/2013 | Lam et al. |
| 2017/0357062 A1 | 12/2017 | Watanabe |

FOREIGN PATENT DOCUMENTS

| | | |
|---|---|---|
| CN | 103885140 A | 6/2014 |
| CN | 103984066 A | 8/2014 |
| CN | 104133271 A | 11/2014 |
| JP | 2007-079175 A | 3/2007 |
| JP | 2009-122354 A | 6/2009 |
| JP | 2010-176010 A | 8/2010 |
| JP | 2013190815 A | 9/2013 |
| JP | 2015-031867 A | 2/2015 |
| WO | 2016-121177 A1 | 8/2016 |
| WO | WO 2016/0121177 A1 * | 8/2016 |

OTHER PUBLICATIONS

Translation for WO 2016/0121177 A1, Watanabe, Aug. 2016 (Year: 2016).*

* cited by examiner

*Primary Examiner* — Jerry Rahll
(74) *Attorney, Agent, or Firm* — Studebaker & Brackett PC (57) ABSTRACT

Provided is an optical path converting component capable of being positioned and fixed with less work steps and with a high degree of accuracy.
The disclosed optical path converting component (10) configured to optically couple an optical input/output interface (20) disposed on a board and an optical transmission path (100) includes a base body (11) disposed on an optical path connecting the optical input/output interface (20) and the optical transmission path (100) and a mounting portion (118, 121) configured to be mounted on a board (CB) by soldering.

8 Claims, 9 Drawing Sheets

OPTICAL PATH CONVERTING COMPONENT

CROSS-REFERENCE TO RELATED APPLICATION

This application claims priority to and the benefit of Japanese Patent Application No. 2016-209826 filed on Oct. 26, 2016, the entire contents of which are incorporated herein by reference.

TECHNICAL FIELD

This disclosure relates to an optical path converting component configured to optically couple an optical input/output interface disposed on a board and an optical transmission path.

BACKGROUND

Conventionally, an optical path converting component configured to couple light output from a board side to an optical fiber through a lens is known. Such an optical path converting component is fixed on a board manually by an operator by using an adhesive. A method of engaging an engaging portion formed in an optical path converting component with a recess and protrusion portion provided on a board side to position an optical path converting component is also known.

For example, an optical module described in patent literature 1 (PTL 1) optically couples a ferrule and a photoelectric conversion element package through a lens. Patent literature 2 (PTL 2) discloses a method in which a positioning pin is fitted into a positioning hole of an optical path conversion optical connector component and a positioning hole on a circuit board to position the optical path conversion optical connector component relative to the circuit board.

CITATION LIST

Patent Literature

PTL 1: JP2007-079175A
PTL 2: JP2013-190815A

SUMMARY

Technical Problem

In the optical coupling, even a subtle misalignment may cause a high optical loss. Thus, an exit surface of the light output from a board side and an optical path converting component are needed to be positioned with a high degree of accuracy, and the number of work steps for the aforementioned positioning is desired to be as small as possible.

However, when an operator manually places an optical path converting component on a board and fixes the optical path converting component on the board with an adhesive, positioning and fixing with a high degree of accuracy are difficult. The number of work steps is increased when the method described in PTL 2 is used.

It would therefore be helpful to provide an optical path converting component capable of being positioned and fixed with a high degree of accuracy and less working steps.

Solution to Problem

An optical path converting component according to a first aspect to solve the aforementioned problem is an optical path converting component configured to optically couple an optical input/output interface disposed on a board and an optical transmission path, the optical path converting component including:

a base body disposed on an optical path connecting between the optical input/output interface and the optical transmission path; and a mounting portion configured to be mounted on the board by soldering.

The optical path converting component according to a second aspect, wherein the base body integrally includes a first lens portion opposed to a coupling surface of the optical input/output interface.

The optical path converting component according to a third aspect, wherein the base body integrally includes a second lens portion opposed to a coupling surface of the optical transmission path.

The optical path converting component according to a fourth aspect, wherein the base body includes therein a reflective portion configured to change an optical path of light entered the base body.

The optical path converting component according to a fifth aspect, wherein the base body further includes a recess provided on a face opposed to the board and surrounding the optical input/output interface disposed on the board.

The optical path converting component according to a sixth aspect, comprising at least two of the mounting portion, wherein on a line connecting two of the mounting portions, a point at which the distance from the optical input/output interface is the shortest is located between two of the mounting portions.

The optical path converting component according to a seventh aspect, wherein the mounting portion is composed of metal.

The optical path converting component according to an eighth aspect, wherein the mounting portion is composed by applying metal plating on a resin surface.

The optical path converting component according to a ninth aspect, further including an elastic portion integrally formed with the mounting portion composed of metal and configured to support an optical connector component that holds the optical transmission path.

Advantageous Effect

According to this disclosure, an optical path converting component capable of being positioned and fixed with a high degree of accuracy and less number of working steps can be provided.

DETAILED DESCRIPTION

Embodiments of this disclosure are described below with reference to the drawings. In the following description, directions of front and back, right and left and up and down are described on the basis of the arrows illustrated in the drawings.

Embodiment 1

Figure 1:
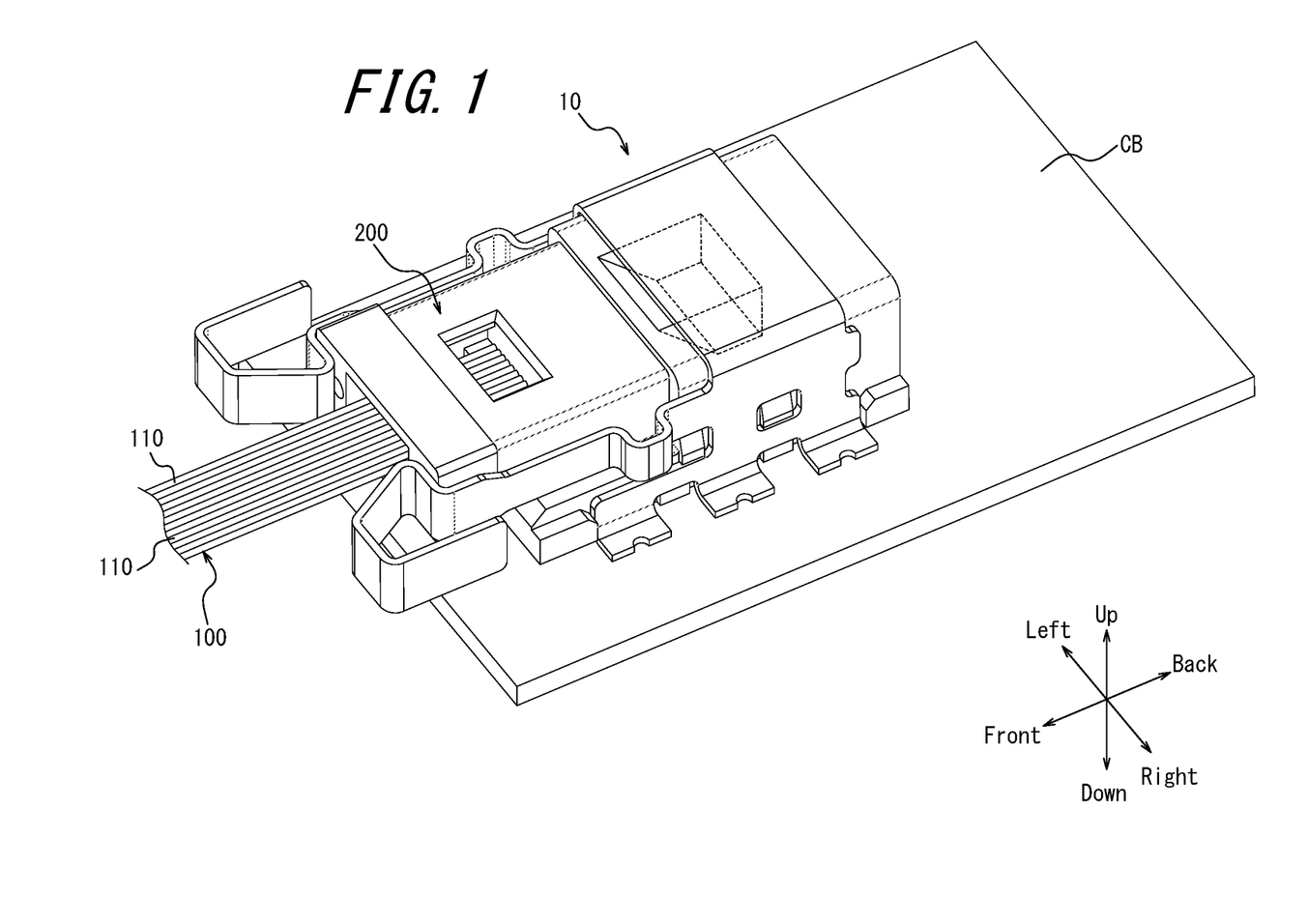
FIG. 1 illustrates an optical path converting component according to Embodiment 1 where an optical connector component that holds an optical transmission path is supported.
Figure 2:
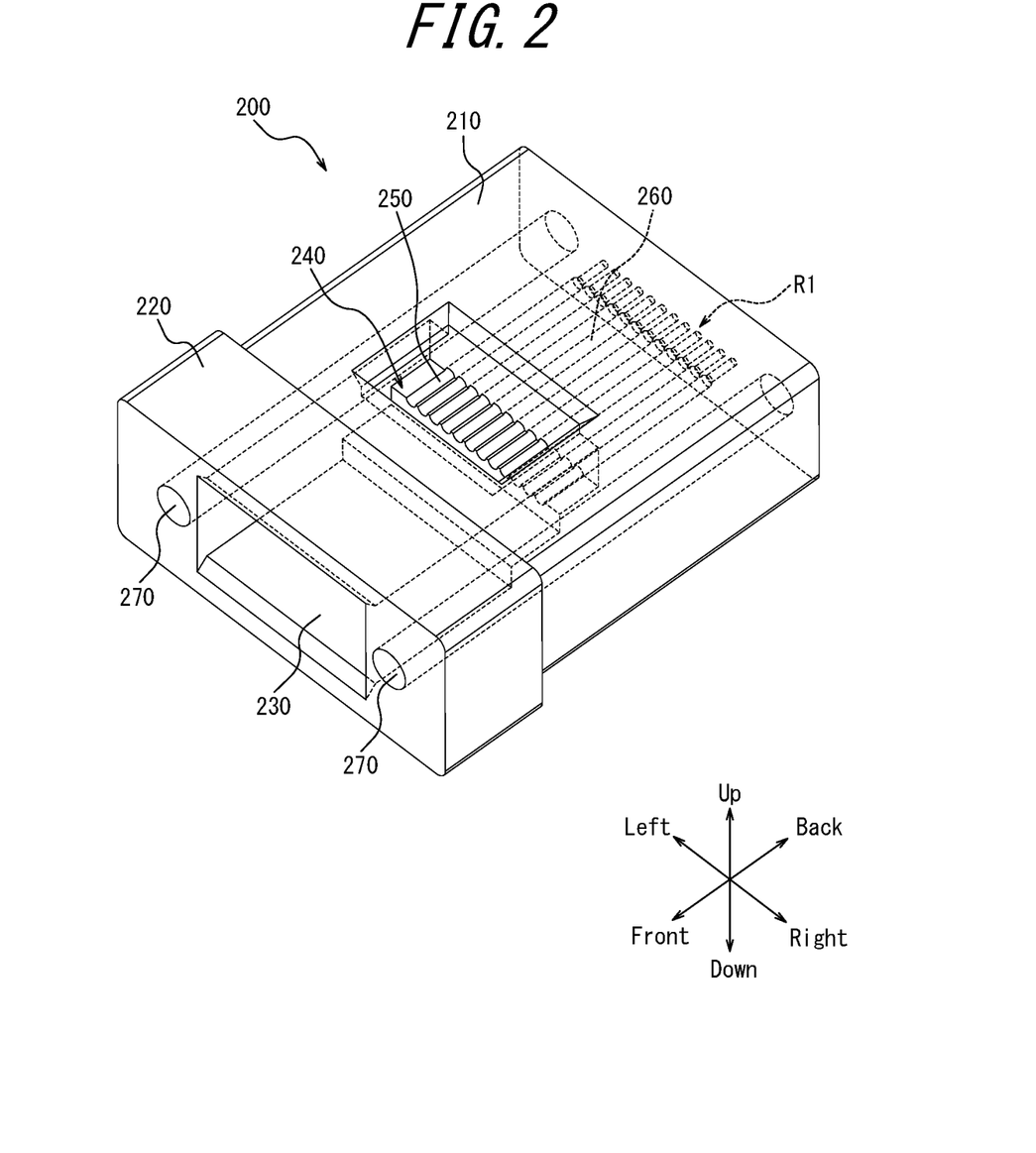
FIG. 2 is a top perspective view of the optical connector component.

FIG. 1 illustrates an optical path converting component 10 according to Embodiment 1 in which an optical connector component 200 that holds an optical transmission path 100 is supported. FIG. 2 is a top perspective view of the optical connector component 200.

The optical transmission path 100 and the optical connector component 200 will be described with reference to FIGS. 1 and 2.

As illustrated in FIG. 1, the optical transmission path 100 is composed of a plurality of optical fibers 110. Each optical fiber 110 has a core and a cladding, and a coating as necessary. A waveguide mode of each optical fiber 110 may be either a single mode or a multi mode. Each optical fiber 110 may be any types of optical fibers such as a general-purpose single mold fiber, a dispersion shift single mode fiber, a step-index multimode optical fiber, and the like. A plurality of optical fibers 110 may be bundled together so that they are coated with a sheath or may not be bundled. The optical fibers 110 are arranged linearly from right to left in the optical connector component 200, for example. The distance between cores of the optical fibers 110 arranged in the optical connector component 200 is approximately the same as the distance between lenses composing the second lens portion 113 of the optical path converting component 10 described later.

The optical connector component 200 has a base portion 210 and an opening forming portion 220 formed continuous in front of the base portion 210.

As illustrated in FIG. 2, an opening 230 configured to insert the optical transmission path 100 is formed in the opening forming portion 220. The optical connector component 200 has a holder 240 configured to hold the optical fibers 110 in the base portion 210. The optical connector component 200 has a plurality of guide grooves 250 in the holder 240. The guide grooves 250 are grooves configured to hold each of the optical fibers 110 forming the optical transmission path 100. The number of guide grooves 250 is equal to or greater than the number of optical fibers 110 forming the optical transmission path 100.

The optical connector component 200 has a plurality of communication holes 260 respectively communicating with the rear of each of the guide grooves 250. The optical connector component 200 holds the optical transmission path 100 with a coupling surface R1 of the optical transmission path 100 exposed rearward from each communication hole 260. The optical connector component 200 has through holes 270 configured to connect with the optical path converting component 10. Each of the through holes 270 is formed on both right and left sides of the optical connector component 200 so as to pass through both right and left ends of the opening forming portion 220 and the base portion 210. The width in the right and left direction of a pair of through holes 270 is the same as that of a pair of projections 115 of the optical path converting component 10 described later.

Figure 3:
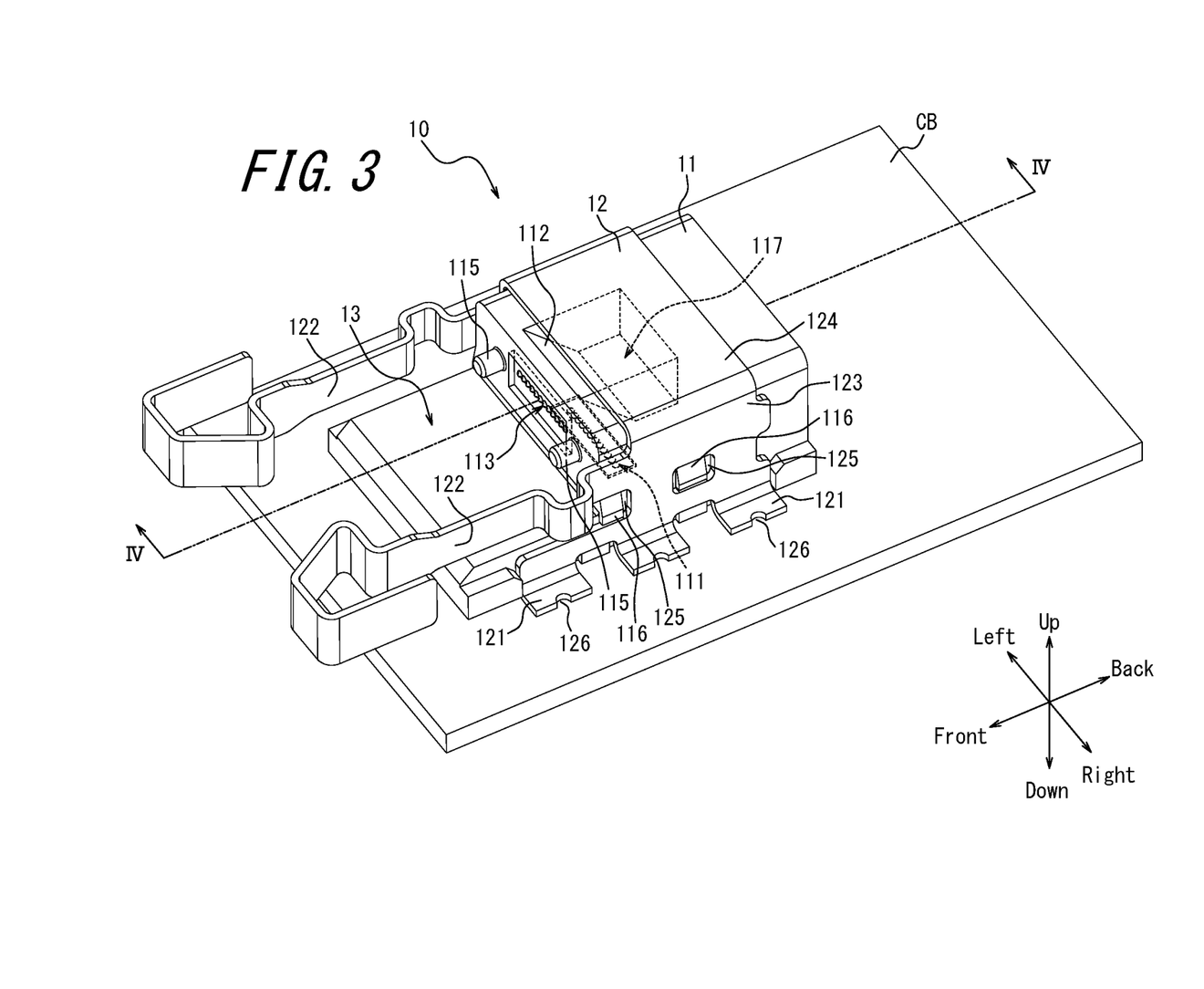
FIG. 3 is a top perspective view of an optical path converting component according to Embodiment 1.
Figure 4:
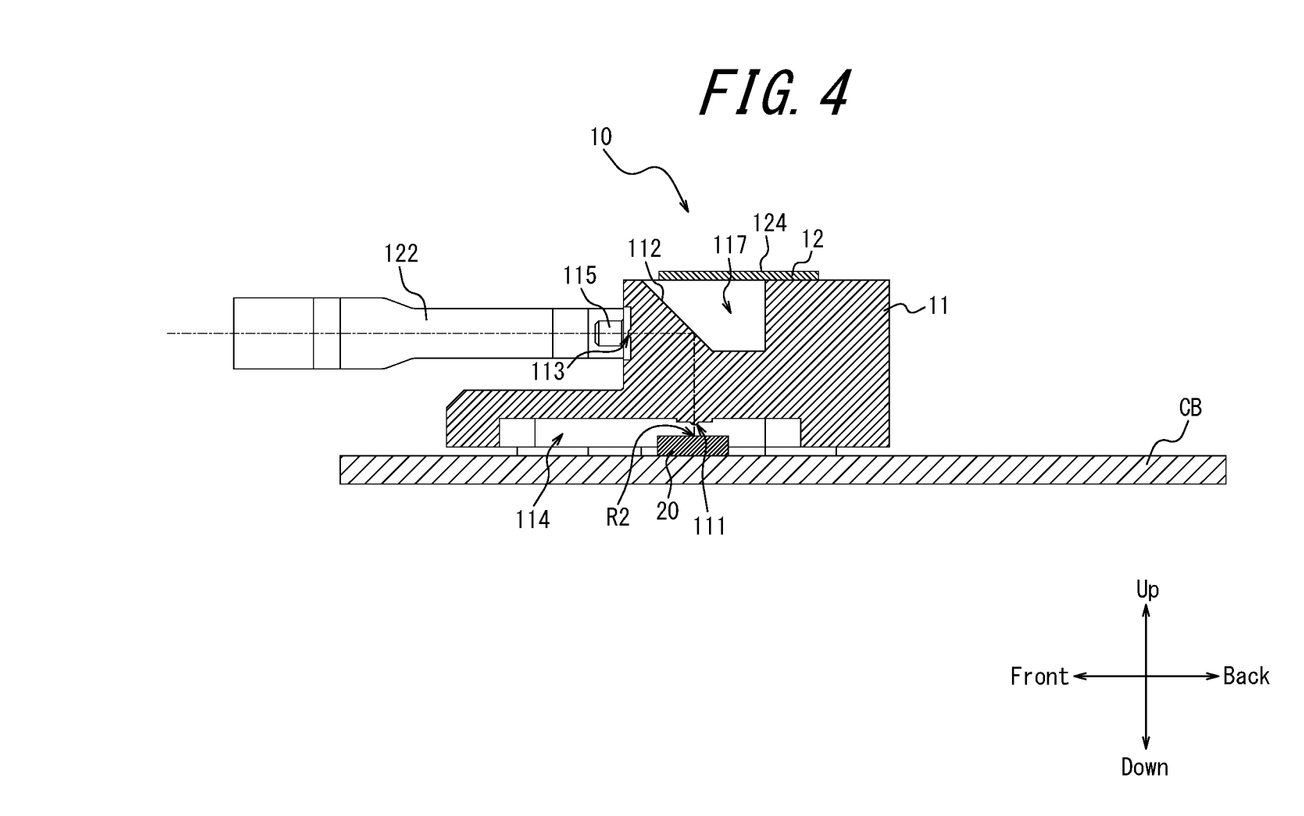
FIG. 4 is a cross-sectional view of the optical path converting component taken along IV-IV arrow in FIG. 3.
Figure 5:
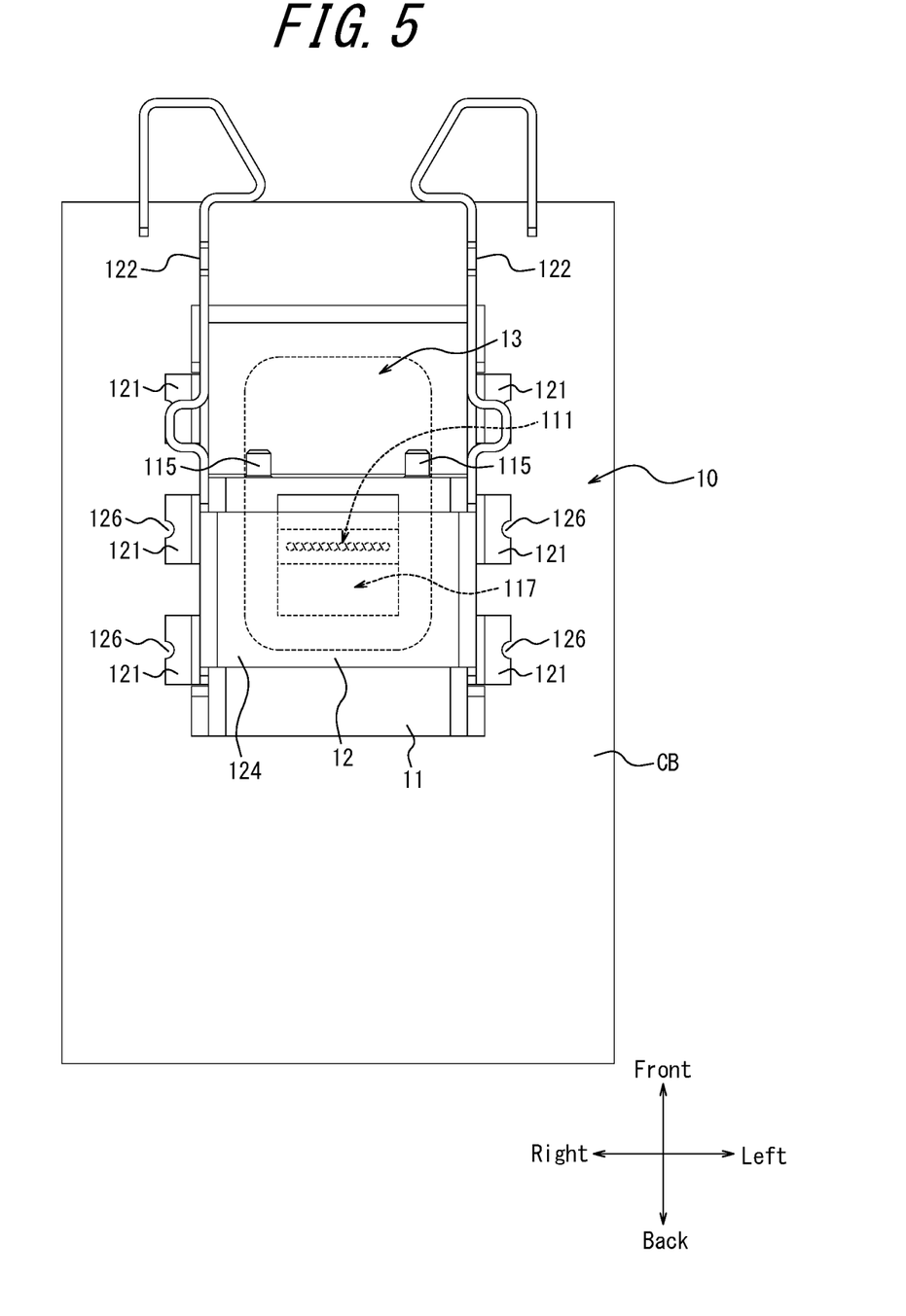
FIG. 5 is a top view of the optical path converting component in FIG. 3.

FIG. 3 is a top perspective view of the optical path converting component 10 according to Embodiment 1. FIG. 4 is a cross-sectional view of the optical path converting component 10 taken along IV-IV arrow in FIG. 3. FIG. 5 is a top view of the optical path converting component 10 in FIG. 3.

The optical path converting component 10 is mounted on a circuit board CB (board). More specifically, the optical path converting component 10 is fixed such that it covers the optical input/output interface 20 disposed on the circuit board CB from above. The optical path converting component 10 optically couples the optical input/output interface 20 disposed on the circuit board CB and the optical transmission path 100.

The optical input/output interface 20 is composed of photoelectric conversion elements such as, for example, light emitting elements and light receiving elements. When the optical input/output interface 20 is composed of light emitting elements, the light emitted from the optical input/output interface 20 enters the optical transmission path 100 through the optical path converting component 10. Conversely, when the optical input/output interface 20 is composed of light receiving elements, the light emitted from the optical transmission path 100 enters the optical input/output interface 20 through the optical path converting component 10. The number of the photoelectric conversion elements composing the optical input/output interface 20 corresponds to the number of optical fibers 110 composing the optical transmission path 100. Hereinafter the optical input/output interface 20 is described as it is composed of light emitting elements, but is not limited thereto. The optical input/output interface 20 may be composed of light receiving elements. In this case, it is to be understood that the light propagation direction described below will be completely opposite.

The optical path converting component 10 has, as a large component, a base body 11 made of resin disposed on an optical path connecting the optical transmission path 100 and the optical input/output interface 20 and a supporting bracket 12 made of metal press fitted over the base body 11. The optical path converting component 10 has an accommodating portion 13 formed by recessing a front half portion of the base body 11 one level below.

The base body 11 is formed by a transparent resin having an excellent heat resistance such as thermoplastic polyimide (TPI) resin and polysulfone (PSU) resin. The base body 11 is not limited to the aforementioned resins, and may be formed of any resin as far as it can resist the temperatures at which solder paste applied to a pattern (not illustrated) on the circuit board CB is heat-melted by a reflow furnace.

As illustrated in FIGS. 3 and 4, the base body 11 has an approximate L-shape. The base body 11 is formed in a shape as illustrated, and integrally has a first lens portion 111, a reflective portion 112, a second lens portion 113, a recess 114, projections 115 and engaging projections 116. The base body 11 has a space 117 formed on the back side of the reflective portion 112.

The first lens portion 111 faces a coupling surface R2 of the optical input/output interface 20 with the optical path converting component 10 fixed onto the circuit board CB.

The first lens portion 111 is located immediately above the coupling surface R2 of the optical input/output interface 20 and is in proximity with the coupling surface R2. The first lens portion 111 has a plurality of lenses made of resin that forms the base body 11. The number of lenses composing the first lens portion 111 corresponds to the number of light emitting elements composing the optical input/output interface 20. The distance between the lenses composing the first lens portion 111 corresponds to the distance between the light emitting elements composing the optical input/output interface 20.

The reflective portion 112 is formed in the base body 11 so as to change an optical path of the light entered the base body 11. More specifically, the reflective portion 112 is located immediately above the first lens portion 111. The reflective portion 112 totally reflects the light by using a difference between a refractive index of the resin forming the base body 11 and a refractive index of the air in the space 117.

The second lens portion 113 faces the coupling surface R1 of the optical transmission path 100 with the optical connector component 200 supported by the optical path converting component 10. The second lens portion 113 is located in the rear of the coupling surface R1 of the optical transmission path 100 and is in proximity with the coupling surface R1. The second lens portion 113 has a plurality of resin lenses composing the base body 11. The number of lenses composing the second lens portion 113 corresponds to the number of optical fibers 110 composing the optical transmission path 100. The distance between lenses composing the second lens portion 113 corresponds to the distance between cores of the optical fibers 110 arranged in the optical connector component 200.

The optical path converting component 10 adjusts the optical path by the first lens portion 111, the reflective portion 112 and the second lens portion 113. The light emitted upward from the optical input/output interface 20 is collimated by the first lens portion 111. The light passed through the first lens portion 111 is totally reflected approximate at right angle by the reflective portion 112. The light totally reflected forward by the reflective portion 112 is collected by the second lens portion 113. The light passed through the second lens portion 113 enters the optical transmission path 100. As described above, the optical path converting component 10 optically couples the optical input/output interface 20 disposed on the circuit board CB and the optical transmission path 100.

The recess 114 is provided on a surface of the base body 11 opposed to the circuit board CB, that is, a bottom of the base body 11. The recess 114 covers the optical input/output interface 20 disposed on the circuit board CB. The recess 114 is formed by a space that is sufficiently larger than the optical input/output interface 20.

Each of the projections 115 is provided at both right and left sides in the front upper half portion of the base body 11. When the optical path converting component 10 supports the optical connector component 200, projections 115 engage respectively with through holes 270 formed respectively on both right and left ends of the optical connector component 200. The optical connector component 200 is mated with the optical path converting component 10. The position of the optical connector component 200 relative to the optical path converting component 10 is determined by the projections 115 and the through holes 270. More specifically, a position of the coupling surface R1 of the optical transmission path 100 relative to the second lens portion 113 is determined.

A pair of engaging projections 116 is provided on each of right and left sides of the base body 11. More specifically, each of the engaging projections 116 is provided at near the center and the front end portion on the side of rear half portion of the base body 11. When the supporting bracket 12 is press fitted, each engaging projection 116 is engaged with each engaging portion 125 described below.

The supporting bracket 12 is molded as illustrated such that it integrally has mounting portions 121 configured to fix the optical path converting component 10 onto the circuit board CB, elastic portions 122, a press-fitting portion 123, a suction surface 124 and engaging portions 125.

The mounting portion 121 is provided such that it protrudes outward in an approximate L-shape on the lower end of the supporting bracket 12. The mounting portion 121 is disposed on a pattern formed on the circuit board CB and soldered thereon. The mounting portion 121 has a recess 126 on a part of a surface in contact with solder. For example, the mounting portion 121 has, near the center of the outermost edge in an approximate L-shape, the recess 126 recessed inward in an approximate semicircular shape viewed from top.

In FIG. 5, six mounting portions 121 are provided in total, three being on each of the right and left sides of the base body 11, for example. For example, on a line connecting specific two mounting portions 121, a point at which the distance from the optical input/output interface 20 is the shortest is located between the two mounting portions 121. For example, the mounting portion 121 located on the left front end of the base body 11 and the mounting portion 121 located on the left rear end thereof are disposed respectively, along the left side of the base body 11, in front and in the rear of the optical input/output interface 20. In this case, on a line connecting these two mounting portions 121, a point at which the distance from the optical input/output interface 20 is the shortest is located between the two mounting portions 121. For example, the mounting portion 121 located on the left front end of the base body 11 and the mounting portion 121 located on the right rear end of the base body 11 are disposed respectively in front and in the rear of the optical input/output interface 20 along both right and left sides of the base body 11. In this case, a line connecting these two mounting portions 121 overlaps the optical input/output interface 20, and a point on the line at which the distance from the optical input/output interface 20 is the shortest, that is, each point on the line overlapping the optical input/output interface 20 is located between the two mounting portions 121.

Each elastic portion 122 protrudes forward at a front half portion on both right and left sides of the supporting bracket 12. Each elastic portion 122 has, at the front end thereof, an inclination inclined inward in the right and left direction from the front to the rear. The elastic portion 122 has elasticity. The optical connector component 200 holding the optical transmission path 100 is held, on the right and left sides thereof, between elastic portions 122.

The press-fitting portion 123 is formed in an approximate U shape at the rear half portion of the supporting bracket 12. When the supporting bracket 12 is press fitted into the base body 11, the press-fitting portion 123 surrounds the base body 11 from the upper side. The press-fitting portion 123 covers the top and both right and left sides of the base body 11.

The suction surface 124 is formed of the upper surface of the supporting bracket 12. The suction surface 124 corresponds to the upper surface of the press-fitting portion 123. The suction surface 124 is a surface onto which a conveyance device not illustrated adsorbs to convey the optical path converting component 10. The optical path converting component 10 is conveyed by the conveyance device through the suction surface 124 and is disposed on a corresponding position on the circuit board CB.

A pair of engaging portions 125 is drilled on both right and left sides of the rear half portion of the supporting bracket 12. Each engaging portion 125 is provided on a position corresponding to each engaging projection 116 of the base body 11. When the supporting bracket 12 is press fitted into the base body 11, each engaging portion 125 is engaged with each engaging projection 116.

The accommodating portion 13 is formed on the front half portion of the base body 11. The accommodating portion 13 is a space surrounded by the upper half portion of the front face of the base body 11, the front half portion of the upper surface of the base body 11 and the elastic portion 122 of the supporting bracket 12. The accommodating portion 13 is a space where the optical connector component 200 is accommodated with the optical path converting component 10 and the optical connector component 200 mated with each other.

Figure 6:
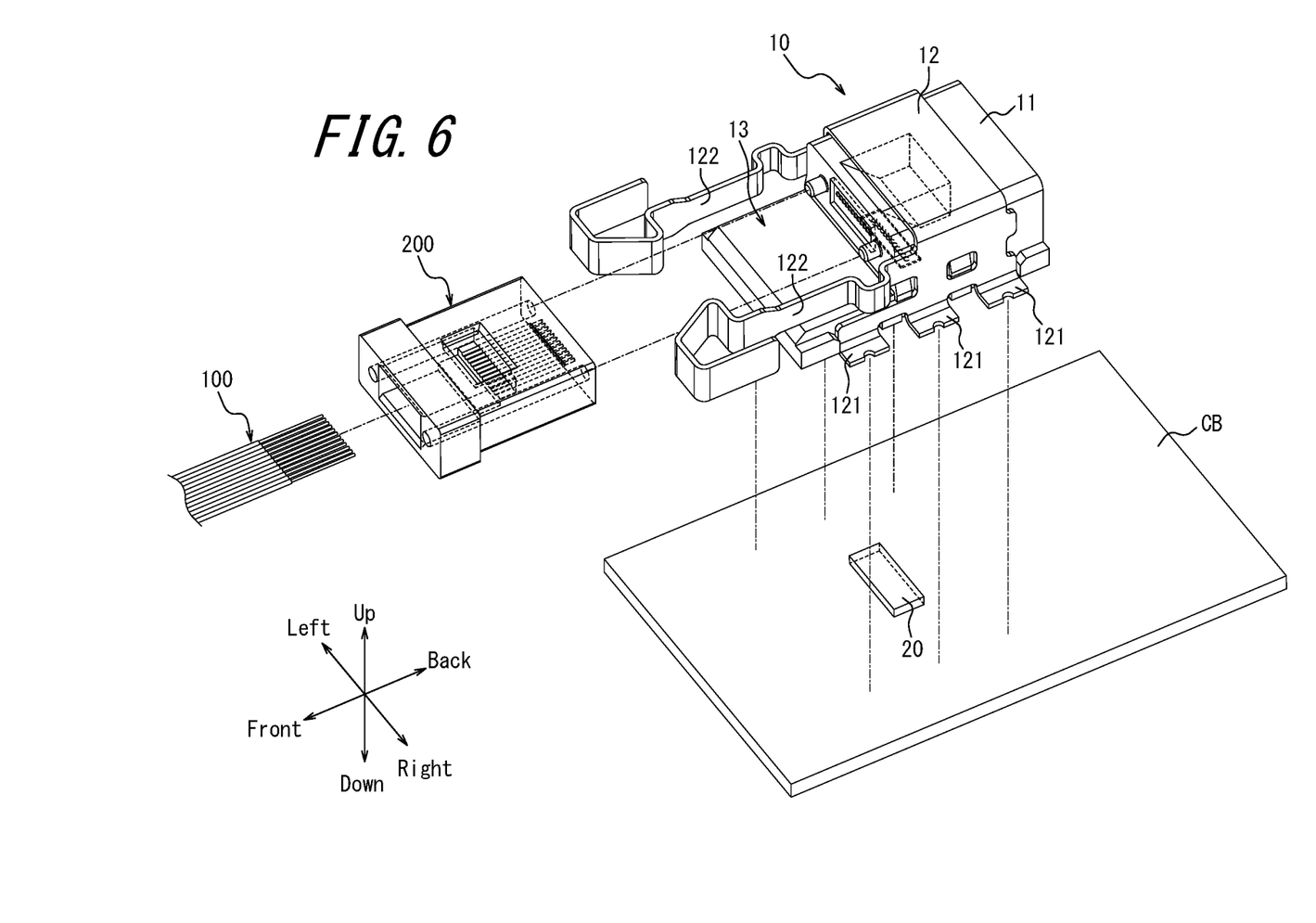
FIG. 6 is an exploded perspective view of the optical path converting component, the optical transmission path and the optical connector component in FIG. 1.

FIG. 6 is an exploded perspective view of the optical path converting component 10, the optical transmission path 100 and the optical connector component 200 in FIG. 1. The following describes an assembly procedure of each component for optically coupling the optical input/output interface 20 disposed on the circuit board CB and the optical transmission path 100.

The optical path converting component 10 in which the supporting bracket 12 is press fitted the base body 11 is conveyed, by a conveyance device, to the corresponding position on the circuit board CB where the optical input/output interface 20 is disposed. More specifically, each mounting portion 121 is placed on a solder paste applied to a corresponding pattern (not illustrated) on the circuit board CB.

Each solder paste is heat-melted in a reflow furnace, and each mounting portion 121 is soldered to the aforementioned pattern. Thus fixing of the optical path converting component 10 on the circuit board CB is completed.

On the other hand, the optical connector component 200 holds the optical transmission path 100, and after that the optical connector component 200 holding the optical transmission path 100 is inserted, from the front, into the elastic portion 122 of the supporting bracket 12. When inserted, each elastic portion 122 opens slightly outward for its elasticity. When the optical connector component 200 is inserted completely between elastic portions 122, elastic portions 122 return to their original positions. As a result, the optical connector component 200 is accommodated in the accommodating portion 13 and is held between the elastic portions 122.

In the optical path converting component 10 according to Embodiment 1 described above, the base body 11 is formed by resin that can withstand the reflow temperatures, which allows for soldering to the circuit board CB. Thus the optical path converting component 10 can be positioned and fixed with a high degree of accuracy. That is, the mounting portion 121 placed on the solder paste is moved spontaneously to the position where a power balance is achieved by the surface tension of solder during reflow, and as a result the optical path converting component 10 is accurately positioned relative to the optical input/output interface 20. In other words, if the conditions such as amount and position of solder applied onto a pattern on the circuit board CB are the almost same, the optical path converting component 10 can be disposed almost on the same position on the circuit board CB. As a result, the optical path converting component 10 can determine the position of the coupling surface R2 of the optical input/output interface 20 relative to the first lens portion 111 with a high degree of accuracy.

The optical path converting component 10 can accurately determine the position of the optical connector component 200 through engagement between the projection 115 and the through hole 270. That is, the optical path converting component 10 can determine the position of the coupling surface R1 of the optical transmission path 100 relative to the second lens portion 113 with a high degree of accuracy.

The optical path converting component 10 can prevent a decrease in overall coupling efficiency even if formation of the first lens portion 111 causes slight misalignment between the coupling surface R2 of the optical input/output interface 20 and the first lens portion 111. In the same manner, the optical path converting component 10 can prevent a decrease in overall coupling efficiency even if formation of the second lens portion 113 causes slight misalignment between the coupling surface R1 of the optical transmission path 100 and the second lens portion 113.

The optical path converting component 10 can be fixed on the circuit board CB by a reflow without requiring any positioning mechanisms such as positioning pins and the like, and thus the working steps and the number of components can be decreased. The elastic portion 122 and the mounting portion 121 are integrally formed into the optical path converting component 10. Therefore, no additional members are required to mate with the optical connector component 200, and as a result the working steps and the number of components are decreased.

In the optical path converting component 10, when the mounting portion 121 is provided with the recess 126, the contact area between the solder and the mounting portion 121 increases, and as a result the effect by the aforementioned surface tension can be increased. In the optical path converting component 10, when the mounting portion 121 is provided with the recess 126, excess solder flows into the recess 126, and as a result, a solder pool is formed for the excess solder, and the optical path converting component 10 can be fixed more firmly.

On a line connecting the two mounting portions 121, a point at which the distance from the optical input/output interface 20 is the shorted is located between the two mounting portions 121, and thus the optical path converting component 10 can prevent rotation about a vertical rotating axis. In other words, in FIG. 5, when the optical path converting component 10 is fixed onto the circuit board CB by soldering, its clockwise or counterclockwise rotation can be prevented by the mounting portion 121 disposed in the aforementioned manner. Therefore the optical path converting component 10 can decrease displacement in the rotating direction.

The optical path converting component 10 has an inclination at the front end of the elastic portion 122, and as a result the guiding performance for mating with the optical connector component 200 is improved.

Embodiment 2

Figure 7:
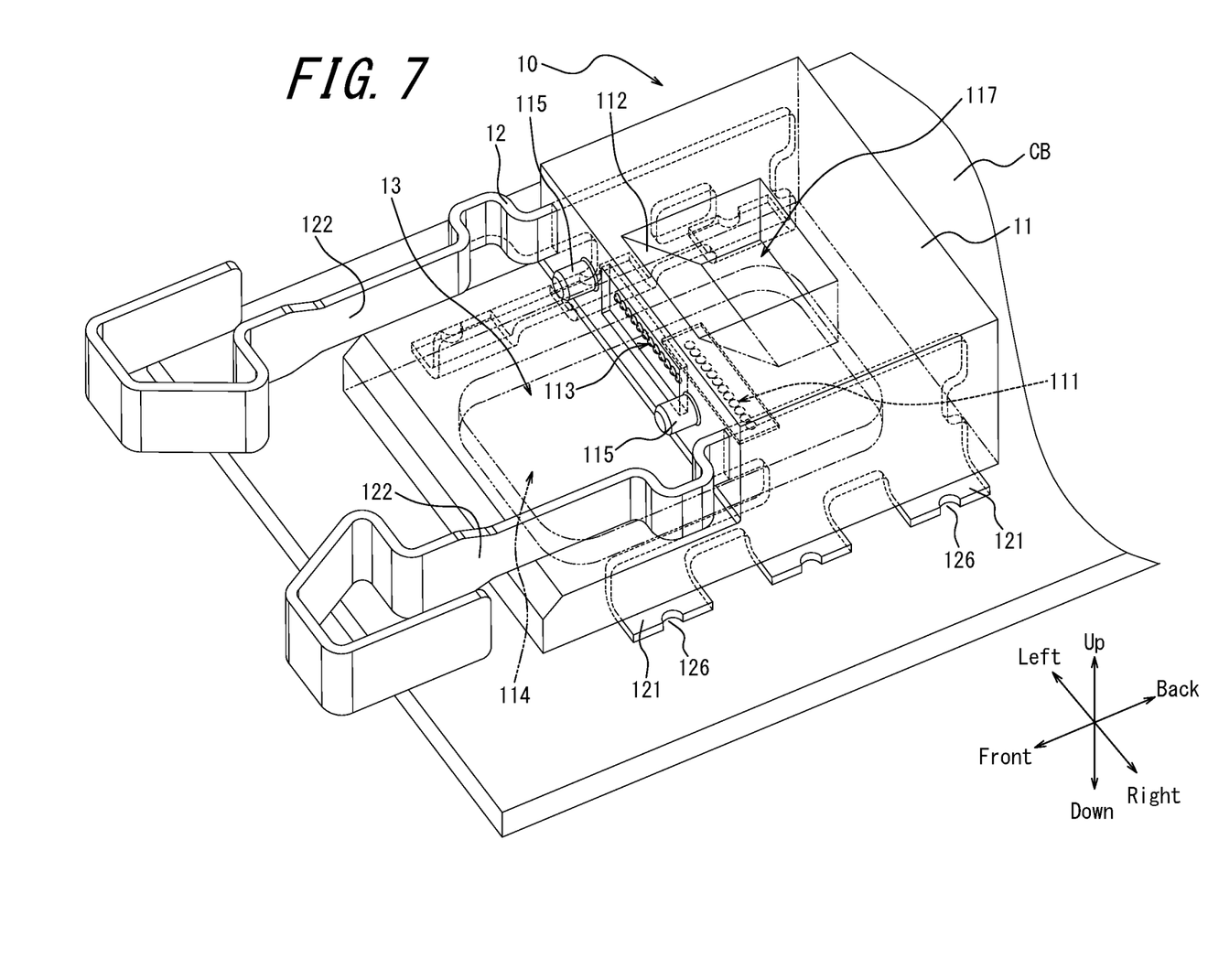
FIG. 7 is a top perspective view of an optical path converting component according to Embodiment 2.

FIG. 7 is a top perspective view of the optical path converting component 10 according to Embodiment 2. The optical path converting component 10 according to this embodiment differs from that of Embodiment 1 in that the base body 11 is molded together with the supporting bracket 12 by insert molding. Other configurations and functions of each component of the optical path converting component 10 according to Embodiment 2 are the same as those of Embodiment 1.

The aforementioned optical path converting component 10 according to Embodiment 2 produces the same effect as those produced by the optical path converting component 10 according to Embodiment 1. In the optical path converting component 10 according to Embodiment 2, the supporting bracket 12 is attached to the base body 11 by insert molding, not by press fitting, and thus the supporting bracket 12 is fixed more firmly to the base body 11.

Embodiment 3

Figure 8:
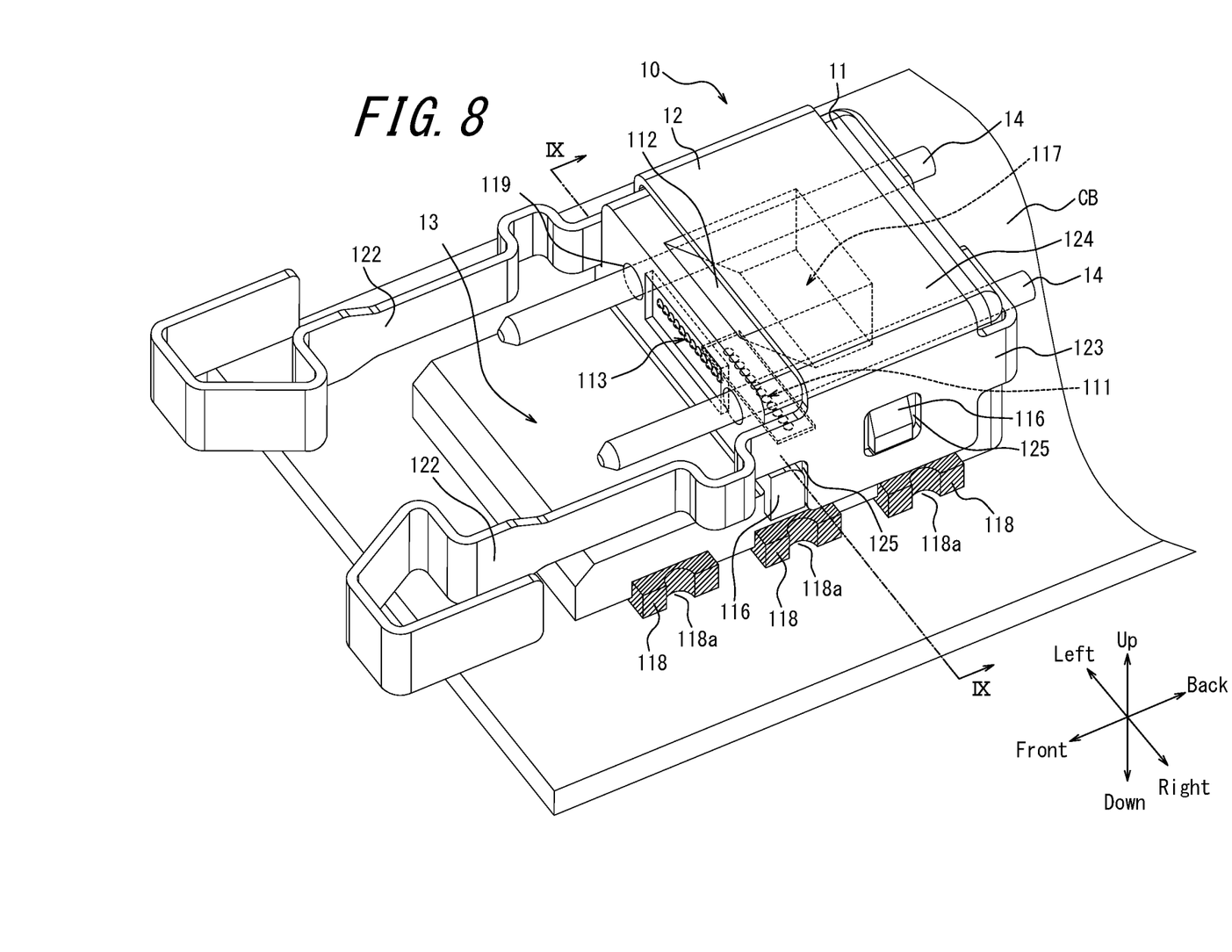
FIG. 8 is a top perspective view of an optical path converting component according to Embodiment 3.
Figure 9:
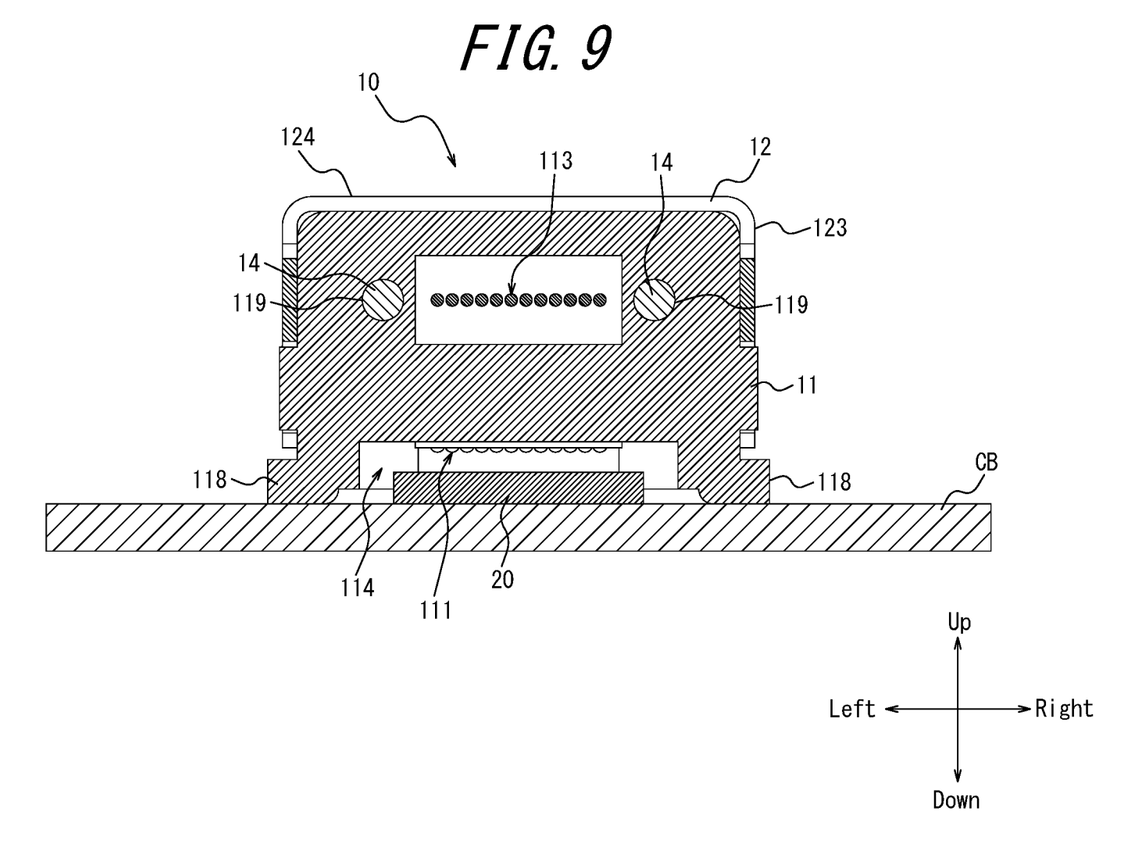
FIG. 9 is a cross-sectional view of the optical path converting component taken along IX-IX arrow in FIG. 8.

FIG. 8 is a top perspective view of the optical path converting component 10 according to Embodiment 3. FIG. 9 is a cross-sectional view of the optical path converting component 10 taken along the IX-IX arrow in FIG. 8. The optical path converting component 10 according to this embodiment illustrated in FIG. 8 is largely different from that according to Embodiment 1 in that the supporting bracket 12 does not have the mounting portion 121 and the base body 11 has a mounting portion 118. In Embodiments 1 and 2, the mounting portion 121 is a part of the supporting bracket 12 made of metal, and thus is composed of metal. On the other hand, in Embodiment 3, the mounting portion 118 is a part of the base body 11 made of resin, and thus as described below, is formed by applying metal plating on the surface of the resin. In the following, the same reference signs are assigned to the same components as those of Embodiment 1 and description thereof is omitted. The points different from Embodiment 1 are mainly described below.

In the optical path converting component 10 according to this Embodiment, the mounting portion 118 is integrally formed on the bottom of the base body 11. The mounting portion 118 is formed by applying metal plating on the surface of the resin forming the base body 11. Examples of materials used for metal plating include, for example, gold, silver, tin, copper-tin alloy, nickel, and the like. Metal plating is applied by a method of, for example, evaporation, sputtering, or resin plating. A part of the mounting portion 118 extends outward from the bottom of the base body 11. The remaining portion of the mounting portion 118 is formed on the bottom of the base body 11. The mounting portion 118 is formed on the bottom of the base body 11 such that it extends from the outside to the inside by a specific width. As with the aforementioned mounting portion 121, the mounting portion 118 has a recess 118a on a part of the surface in contact with solder. For example, the mounting portion 118 has, near the center of the outermost edge, the recess 118a recessed inward in an approximate semicircular shape viewed from top.

The optical path converting component 10 according to this embodiment has through holes 119 instead of projections 115. Each through hole 119 is formed on both right and left sides such that it passes through the base body 11 in the front and back direction on the upper portion of the base body 11. The optical path converting component 10 further has a pair of positioning pins 14. A pair of positioning pins 14 is inserted into a pair of through holes 119. When the optical connector component 200 is inserted into the elastic portion 122, the positioning pins 14 are inserted into the through holes 270. As a result, the optical connector component 200 is mated with the optical path converting component 10.

As aforementioned, the optical path converting component 10 according to Embodiment 3 produces the same effects as those produced by the optical path converting component 10 according to Embodiment 1. In the optical path converting component 10 according to Embodiment 3, the mounting portions 118 are formed also on the bottom of the base body 11, and thus the fixed area can be maintained while the area of the portion extending outside of the base body 11 is decreased. As a result of this, the optical path converting component 10 according to Embodiment 3 can ensure fixing strength similar to that of Embodiment 1 while space saving is realized.

It is to be noted that, it will be apparent to those skilled in the art that this disclosure can be realized in other specific embodiments other than the aforementioned embodiments without departing from the spirit or essential characteristics thereof. Therefore it is to be understood that the above descriptions are merely examples and this disclosure is not limited thereto. The scope of this disclosure is defined by the appended claims, not by the aforementioned description. Of all modifications, some modifications made within a scope of the equivalent of this disclosure are to be included therein.

For example, in the aforementioned each embodiment, the mounting portion may be formed vertical to the circuit board CB onto which the mounting portion is fixed. Each mounting portion is described to have a recess that is recessed inward in an approximate semicircular shape viewed from the top, but it is not limited thereto. Each mounting portion may have an opening in a part of the portion to be soldered. On the other hand, each mounting portion may not have a recess or an opening, and may be formed such that a portion to be soldered has a flat plate shape.

In the aforementioned each embodiment, three mounting portions are provided on each of right and left sides of the base body 11, but the number is not limited thereto. Any number of mounting portions may be provided as far as they can fix the optical path converting component 10 on the circuit board CB. The number of mounting portions may not be the same on the right and left sides of the base body 11.

The optical input/output interface 20 may not be composed of a photoelectric conversion element, and may be composed of an optical waveguide and a mirror formed on the circuit board CB. In this case, the light emitted forward from the optical waveguide is once reflected upward by the mirror and enters the first lens portion 111 of the optical path converting component 10. After that, the light emitted from the optical waveguide is coupled to the optical transmission path 100. Alternatively, the light emitted from the optical transmission path 100 passes through the first lens portion 111, is reflected rearward by the mirror and is coupled to the optical waveguide.

Although the base body 11 is described as it integrally includes the first lens portion 111 and the second lens portion 113, it is not limited thereto. The base body 11 may have only either of the lenses as far as the optical input/output interface 20 and the optical transmission path 100 can be optically coupled, or may have no lenses.

REFERENCE SIGNS LIST

10 Optical path converting component
11 Base body
111 First lens portion
112 Reflective portion
113 Second lens portion
114 Recess
115 Projection
116 Engaging projection
117 Space 118 Mounting portion
118a Recess
119 Through hole
12 Supporting bracket
121 Mounting portion
122 Elastic portion
123 Press-fitting portion
124 Suction surface
125 Engaging portion
126 Recess
13 Accommodating portion
14 Positioning pin
20 Optical input/output interface
100 Optical transmission path
110 Optical fiber
200 Optical connector component
210 Base portion
220 Opening forming portion
230 Opening
240 Holder
250 Guide groove
260 Communication hole
270 Through hole
CB Circuit board
R1 Coupling surface
R2 Coupling surface

The invention claimed is:

1. An optical path converting component configured to optically couple an optical input/output interface disposed on a board and an optical transmission path, comprising:
   a base body having a first side surface and a second side surface and disposed on an optical path connecting between said optical input/output interface and said optical transmission path; and
   four mounting portions configured to be mounted on said board by soldering, two of said four mounting portions being disposed apart from each other on each of said first side surface and said second side surface,
   wherein said base body is separated from said board in a state where said four mounting portions are mounted on said board by soldering, and
   wherein said four mounting portions are disposed apart from each other such that said optical input/output interface is located in a region having two of said four mounting portions for said first side surface and two of said four mounting portions for said second side surface as vertices.

2. The optical path converting component according to claim 1, wherein said base body integrally comprises a first lens portion opposed to a coupling surface of said optical input/output interface.

3. The optical path converting component according to claim 1, wherein said base body integrally comprises a second lens portion opposed to a coupling surface of said optical transmission path.

4. The optical path converting component according to claim 1, wherein said base body comprises therein a reflective portion configured to change an optical path of light entered said base body.

5. The optical path converting component according to claim 1, wherein said base body further comprises a recess provided in a face opposed to said board and surrounding said optical input/output interface disposed on said board.

6. The optical path converting component according to claim 1, wherein said mounting portion is composed of metal.

7. The optical path converting component according to claim 6, further comprising an elastic portion integrally formed with said mounting portion composed of metal and configured to support an optical connector component that holds said optical transmission path.

8. The optical path converting component according to claim 1, wherein said mounting portion is composed by applying metal plating on a resin surface.

* * * * *